United States Patent [19]

Hager et al.

[11] Patent Number: 5,227,140
[45] Date of Patent: Jul. 13, 1993

[54] MODULAR SELF-CLEANING OXIDATION CHAMBER

[75] Inventors: Donald G. Hager; Ronald L. Peterson, both of Tucson, Ariz.

[73] Assignee: Peroxidation Systems, Inc., Tucson, Ariz.

[21] Appl. No.: 739,811

[22] Filed: Aug. 2, 1991

Related U.S. Application Data

[63] Continuation-in-part of Ser. No. 509,337, Apr. 13, 1990, Pat. No. 5,037,618.

[51] Int. Cl.⁵ .......................... B01J 19/08; B01J 19/12
[52] U.S. Cl. ............................ 422/186.3; 250/432 R; 250/436
[58] Field of Search ........... 422/186.3, 186.07, 186.11, 422/24, 905; 250/432 R, 435, 436, 437

[56] References Cited

U.S. PATENT DOCUMENTS

| | | | |
|---|---|---|---|
| 2,072,417 | 3/1937 | Berndt et al. | 250/436 |
| 3,061,721 | 10/1962 | Brenner | 250/436 |
| 3,138,708 | 6/1964 | Ellner et al. | 250/436 |
| 3,413,465 | 11/1968 | Harrison et al. | 250/436 |
| 3,462,597 | 8/1969 | Young | 250/436 |
| 3,904,363 | 9/1975 | Free | 250/431 |
| 4,002,918 | 1/1977 | Graentzel | 250/431 |
| 4,151,085 | 4/1979 | Malik | 210/101 |
| 4,179,616 | 12/1979 | Covello et al. | 250/527 |
| 4,274,970 | 6/1981 | Beitzel | 210/748 |
| 4,897,246 | 1/1990 | Peterson | 422/186.3 |
| 4,922,114 | 5/1990 | Boehme | 250/436 |
| 4,952,376 | 8/1990 | Peterson | 422/186.3 |
| 4,968,489 | 11/1990 | Peterson | 422/186.3 |
| 5,037,618 | 8/1991 | Hager | 422/186.03 |
| 5,133,945 | 7/1992 | Hallett | 422/186.3 |

Primary Examiner—Donald P. Walsh
Assistant Examiner—Daniel J. Jenkins
Attorney, Agent, or Firm—Daniel C. McKown

[57] ABSTRACT

An oxidation chamber used for irradiating an incoming liquid containing unwanted organic pollutants has a structure that facilitates automatic self-cleaning at intervals. A modular construction is used, and three basic types of modules are employed. One of the modules is a TEFLON® lined carbon steel pipe through which a shuttling scraper is forced at intervals. The shuttling scraper includes an annular wiper that simultaneously cleans the inside surface of the surrounding tubular module as well as the outside surface of an enclosed quartz tube. The annular wiper sealingly engages the quartz tube and the tubular module so that it is driven like a piston by the full pressure of the liquid. When the shuttling scraper has reached the end of the tubular module, it parks itself in a position that causes only minimal pressure drop. This automatic self-cleaning feature of the oxidation chamber overcomes one of the most serious problems encountered with this type of equipment, namely the tendency of a slime to form on the UV lamps and on the normally reflective walls of the chamber, thereby reducing the efficiency by reducing the amount of UV radiation reaching the liquid. When this occurred in prior art apparatus, it was necessary to shutdown the operation and to dismantle the oxidation chamber to clean the lamps and chamber walls.

5 Claims, 3 Drawing Sheets

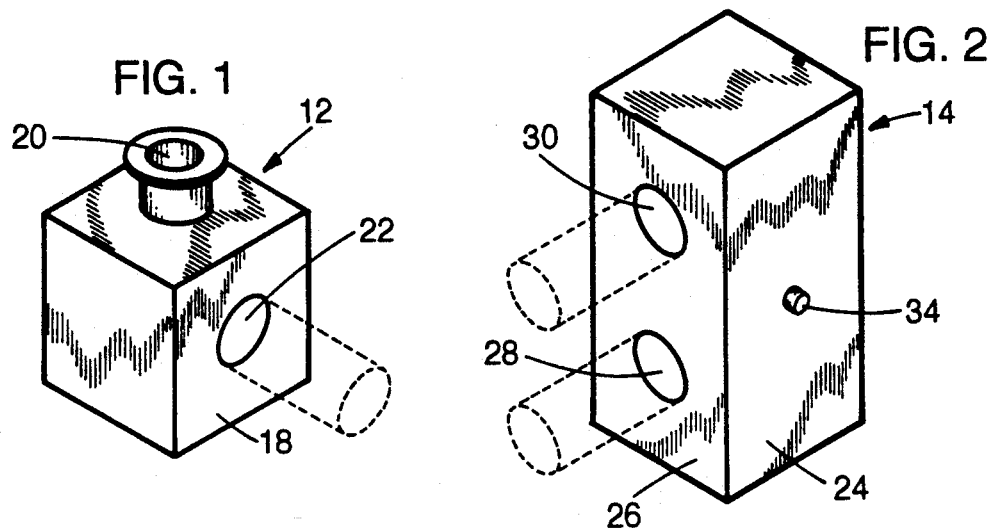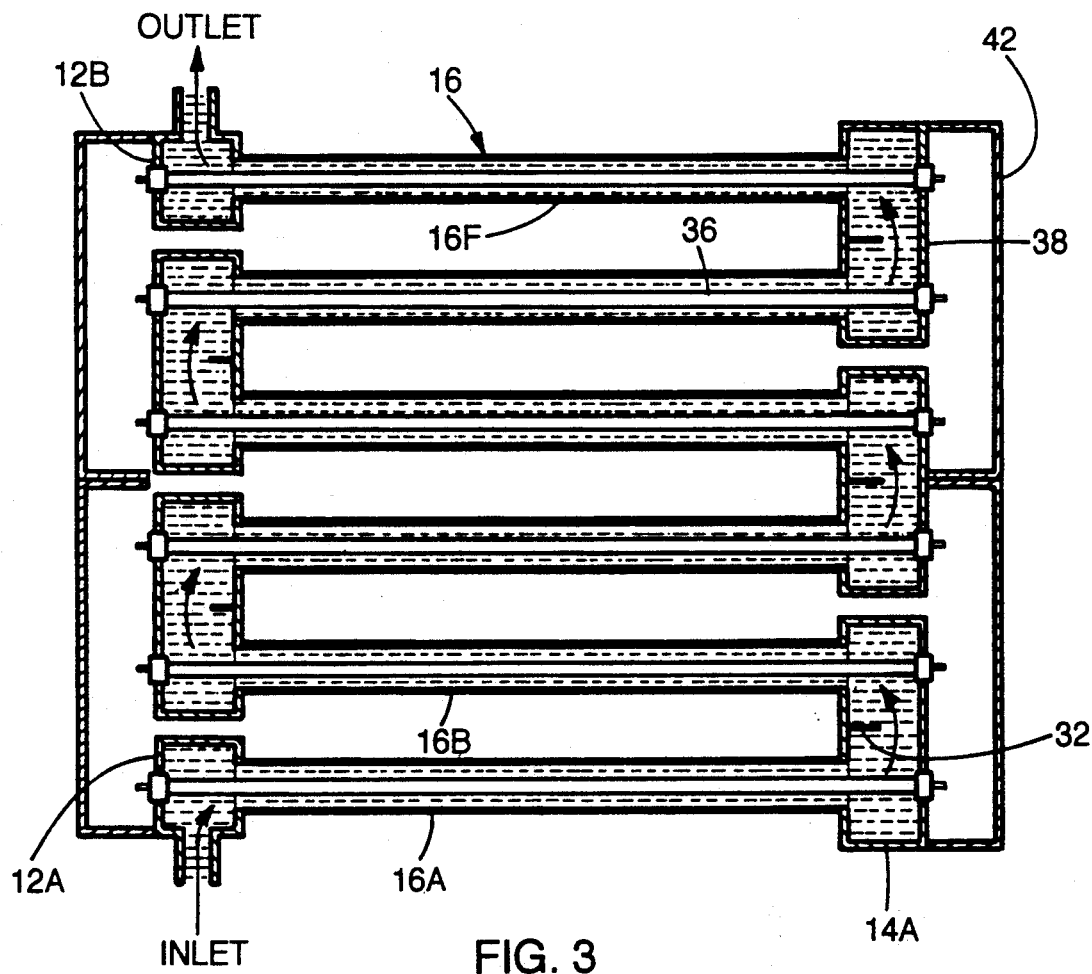

MODULAR SELF-CLEANING OXIDATION CHAMBER

REFERENCE TO COPENDING APPLICATIONS

The present application is a continuation-in-part of U.S. patent application Ser. No. 07/509,337 filed on Apr. 13, 1990, now U.S. Pat. No. 5,037,618 issued Aug. 6, 1991 for Oxidation Chamber.

BACKGROUND OF THE INVENTION

1. The Prior Art

U.S. Pat. No. 4,897,246 issued Jan. 30, 1990 discloses a type oxidation chamber in which a liquid contaminated by undesirable organic compounds is treated. As the liquid passes through the oxidation chamber, it is subjected to intense ultraviolet (UV) radiation from high-powered UV lamps mounted inside quartz tubes that extend through the liquid in the chamber. Simultaneously the liquid is subjected to chemical attack by the injection of hydrogen peroxide. U.S. Pat. No. 4,897,246 has been assigned by Ronald L. Peterson to the assignee of the present invention, Peroxidation Systems, Inc. of Tucson, Ariz., as have the following patents.

U.S. Pat. No. 4,952,376 issued Aug. 28, 1990 discloses how a large tank-like oxidation chamber can be divided by baffles to provide either series or parallel flow paths as required by the liquid being processed.

U.S. Pat. No. 4,968,489 issued Nov. 6, 1990 shows the application of a fluoroethylene propylene (FEP) sleeve around the quartz tube that contains the ultraviolet lamp used in processing the liquid. The FEP sleeve facilitates cleaning of the quartz tube and serves to protect it.

U.S. Pat. No. 5,037,618 issued Aug. 6, 1991 discloses cladding the walls of the oxidation chamber with a UV-reflective material such as polytetrafluoroethylene (TEFLON ®) or polyvinylidene fluoride (KYNAR ®). Also disclosed is a way of partitioning the tank-like oxidation chamber to provide a segmented flow path of considerable length, adaptable to the application of a succession of treatments to the liquid.

All of the patents referred to above are incorporated by reference into the present disclosure.

Notwithstanding the ingenuity of the inventions described in the above patents, the treatment process continues to produce fouling of the quartz tubes and of the interior of the oxidation chamber. The fouling reduces the optical efficiency of the chamber to the point where the processing must be interrupted and the quartz tubes removed for cleaning. The walls of the chamber may also be cleaned at the same time. Such interruptions are highly undesirable. This is the central problem addressed by the present invention.

SUMMARY OF THE INVENTION

The present invention includes an oxidation chamber that cleans itself upon command. Upon determining that cleaning is needed, the operator has only to push an electrical switch to initiate the cleaning action, which then proceeds automatically to completion. The automatic cleaning process requires less than a minute, and there is no need to disassemble the oxidation chamber. In fact, there is no need to interrupt the processing of the contaminated liquid.

The self-cleaning function can be initiated automatically in a number of ways. In a first alternative embodiment a timer is used to initiate the cleaning function at regular intervals determined by experience. In a second alternative embodiment, the UV radiation at one of the sampling ports is monitored, and any substantial weakening of the radiation indicates the need for cleaning. In a third alternative embodiment, the contaminant level in the effluent is monitored, and when it becomes larger (in relation to the incoming contaminant level and the reagent used) the need for cleaning is indicated. Finally, in a fourth alternative embodiment, a compound that is sensitive to UV exposure is introduced to the incoming stream, and the condition of this compound in the effluent is monitored to determine whether cleaning is needed.

In accordance with the present invention, the cleaning function is performed by a unique shuttling scraper that is pushed through a cylindrical oxidation tube by the pressure of the liquid being treated. The shuttling scraper fits closely within this oxidation tube, so that the shuttling scraper scrapes the interior cylindrical surface of the oxidation tube as well as the outer cylindrical surface of a quartz tube that surrounds and protects the ultraviolet lamp that is positioned along the common axis of both the quartz tube and the oxidation chamber tube. Thus, the oxidation chamber is designed specifically for use with the shuttling scraper.

In accordance with the present invention, the complete oxidation chamber is formed of three basic structures, also called modules. A first type of module is a tube, referred to below as an oxidation tube or tubular module, which houses the ultraviolet lamp and its protective quartz tube.

A second type of module is the return section, which reverses the flow direction and which therefore is attached to the ends of two of the tubular modules. A third type of module is the input/output (I/O) section which connects and end of one of the tubes to a source of contaminated water or to a drain for the treated liquid.

In accordance with the present invention, the tubular modules include a TEFLON ® lining. The tubular modules ordinarily would all have the same length, and the length can be chosen to match the requirements of the liquid to be treated.

From these three basic types of modules, oxidation chambers including three, six, nine, or some other multiple of three, tubular sections can be constructed readily. This modular approach to oxidation chamber design minimizes the number of types of parts that must be stocked, and simplifies construction of the chamber.

Both the input/output modules and the return modules include injection and sampling ports for monitoring the progress of the process and for injecting liquid reagents at various stages of the process.

The TEFLON ® lining of the tubular modules protects those modules from the corrosive action of the liquid, permitting the tubular modules to be made of a less expensive material such as carbon steel. Only the input/output modules and the return sections need to be made of corrosion resistant metal.

In accordance with the present invention, a shuttling scraper is contained within each of the tubular modules. After the shuttling scraper has completed its journey through its tubular section, the shuttling scraper is parked within the return module or input/output module at the end of the tubular module. When it is again necessary to clean the tubular modules, the direction of flow through the entire oxidation chamber is reversed.

This causes the shuttling scrapers to be propelled through the entire length of the tubular modules, and to be parked at the opposite end from which they started.

In accordance with the present invention, the shuttling scraper includes two axially spaced annular disks joined by a spring or other suitable resilient component.

The outer periphery of each of the annular disks of the shuttling scraper serves to scrape the deposits from the inside TEFLON ® surface of the tubular modules, while the portions of the annular disks that define the central aperture scrape deposits from the FEP sleeve that covers the central quartz tube that encloses the UV lamp.

In the preferred embodiment, the outside diameter of the annular disk is very slightly greater than the inside diameter of the tubular module, so that a slight interference fit is obtained. Likewise, the diameter of the central aperture of the annular disks is slightly smaller than the outside diameter of the quartz tube, again to obtain a slight interference fit.

In accordance with the preferred embodiment, the spring that connects the two annular disks of the shuttling scraper accomplishes the dependable and automatic movement of the shuttling scraper through the tubular module each time the direction of flow is reversed. When the liquid is flowing, the shuttling scraper is parked in one of the return modules or in one of the I/O modules where the shuttling scraper is protected from the intense UV radiation of the lamp. The force of the flow of liquid impinges on the annular disk closest to the end of the tubular module, compressing the spring to permit that annular disk to yield to the force of the flowing liquid by moving further into the return section or I/O section so as not to significantly impede the flow. When the flow is reversed, the elastic restoring force of the spring pushes the disk nearest the tubular module into the open end of the tube where it is caught up in the flow of liquid and driven into the tubular module, pulling after it the remainder of the shuttling scraper. In this way, reliable motion of the shuttling scraper is assured each time the direction of flow is reversed.

If an obstacle is encountered as the shuttling scraper is moving within the tubular module, the force of the moving liquid tends to compress the spring joining the annular disks, and because of the helical shape of the spring, this compression results in a slight rotation of the obstructed disk about the axis of the tube. The slight rotation of the disk is often adequate to free the disk from the obstruction so that the shuttling scraper can continue its journey through the tubular module.

In accordance with the present invention, an external manifold is provided with automatically-controlled powered valves so that the flow through the oxidation chamber can be reversed when needed.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view showing an input/output module used in a preferred embodiment of the present invention;

FIG. 2 is a perspective view showing a return module of the type used in a preferred embodiment of the present invention;

FIG. 3 is a side elevational view showing the modular construction of the oxidation chamber in a preferred embodiment;

DETAILED DESCRIPTION OF THE PREFERRED EMBODIMENT

Figure 4:
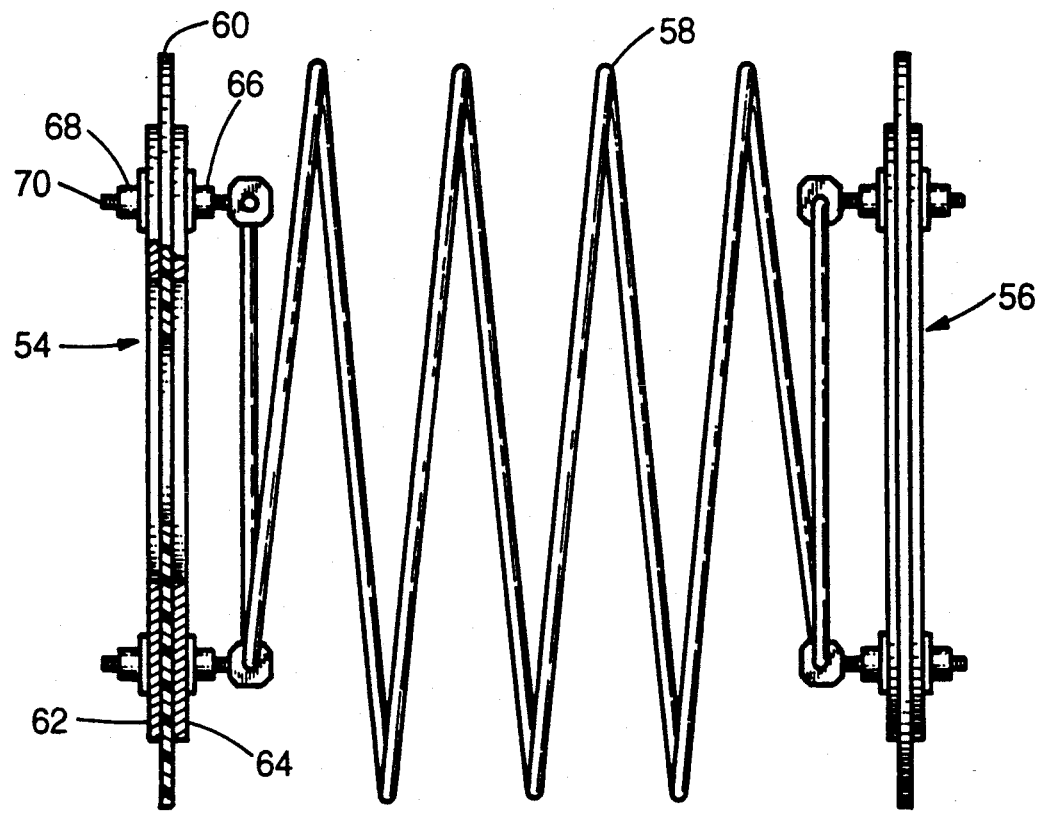
FIG. 4 is a side elevational view partly in cross section showing the shuttling scraper used in a preferred embodiment of the invention.

FIGS. 1-3 show in diagrammatic form the various modules of which the oxidation chamber of the present invention is constructed. These include the inlet/outlet module 12 of FIG. 1, the return module 14 of FIG. 2, and the tubular modules 16 visible in FIG. 3.

In the preferred embodiment, the inlet/outlet module 12 of FIG. 1 includes a hollow rectangular enclosure 18 to which a flanged pipe 20 leads, and which includes an aperture 22 for receiving one end of a tubular module 16. The flanged pipe 20 is connected to a supply pipe or a discharge pipe.

The return module shown in FIG. 2 also includes a hollow rectangular enclosure 24, and further includes in one of its faces 26 two apertures 28 and 30 for receiving the ends of two of the tubular modules 16.

The inlet/outlet modules 12, the return modules 14, and the tubular modules 16 are connected together as shown in FIG. 3 to form a single extended flow path.

In the preferred embodiment shown in FIG. 3, the tubular modules 16 are composed of a 6 inch diameter carbon steel pipe lined with a layer of TEFLON ®. The TEFLON ® layer prevents the liquid being treated from coming into direct contact with the carbon steel of the pipes which avoids the expense of having to use pipes made of a corrosion-resistant material. In the preferred embodiment however, the inlet/outlet module 12 and the return module 14 are composed of a corrosion-resistant material such as stainless steel.

As best seen in FIG. 3, the liquid to be treated enters the oxidation chamber through the inlet module 12A which redirects the liquid into the tubular module 16A. The latter conducts the liquid to the return module 14A which reverses its direction and directs the liquid into the tubular module 16B. The flow path continues in this manner until the liquid is conveyed by the tubular module 16F to the outlet module 12B.

Each of the return modules 14 includes at least one fixed baffle, of which the baffle 32 is typical. The purpose of the baffle 32 is to increase the turbulence of the liquid to promote better mixing of the liquid with reagents that are added through a sampling/injection port 34 located on the side of the return module.

In the preferred embodiment shown in FIG. 3, each of the tubular modules 16 contains a quartz lamp enclosure 36 that is coaxial with the tubular module 16 and that extends through the return modules at either end of the tubular module. The quartz tube 36 is sealed to the outside wall 38 of the return module 14 by the apparatus shown in U.S. Pat. No. 4,897,246 issued on Jan. 30, 1990. The ultraviolet lamp is mounted within the quartz tube 36 so as to be concentric with it.

The ends of the quartz tubes 36 extend beyond the outside wall 38 of the return modules and into the air space within the box formed by the cover 42.

Figure 6:
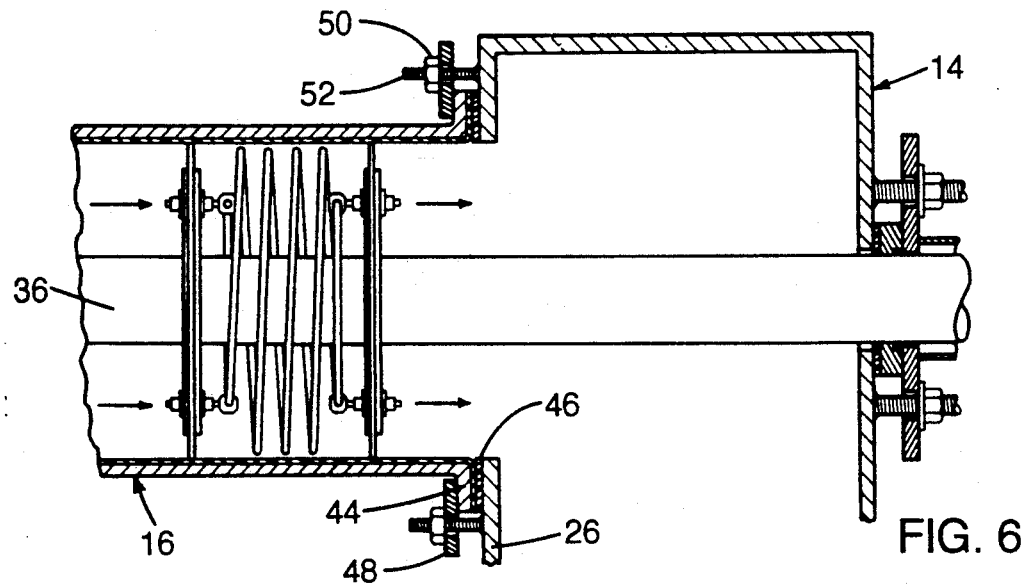
FIG. 6 is a side elevational view partly in cross section showing the shuttling scraper moving through a tubular module.
Figure 7:
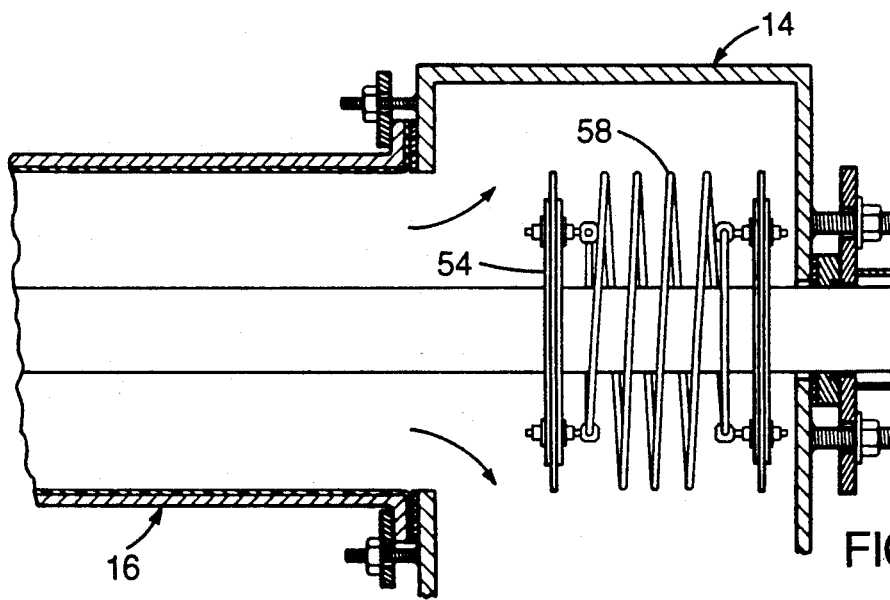
FIG. 7 is a side elevational view partly in cross section showing the shuttling scraper parked after having traversed a tubular module.
Figure 8:
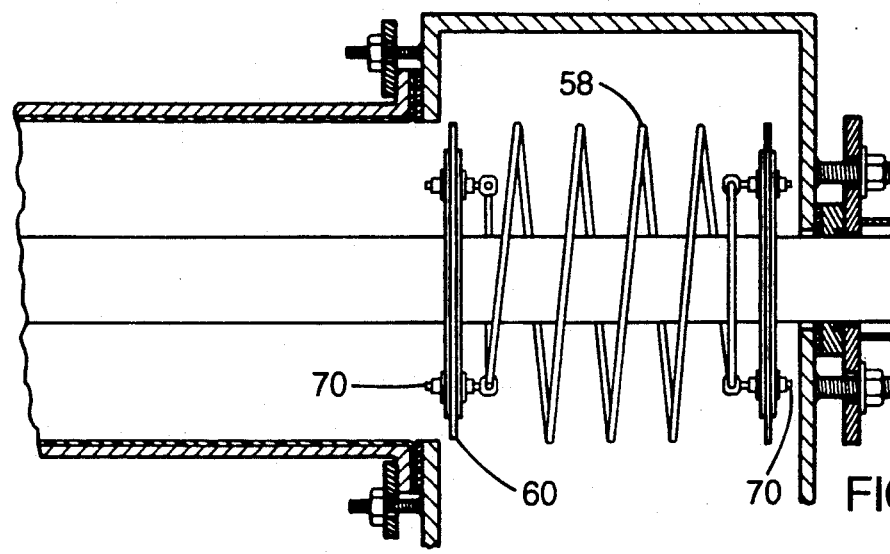
FIG. 8 is a side elevational view partly in cross section showing the position of the shuttling scraper when no liquid is flowing in the oxidation chamber.

The tubular modules 16 are joined to the return modules 14 in the preferred embodiment by using the structure seen in FIGS. 6, 7 and 8.

A flange 44 is produced at the end of the tubular module 16, and this flange 44 is pressed against the gasket 46 by the annular plate 48 that is drawn toward the surface 26 of the return module 14 by tightening the nuts 50 on the studs 52. A similar arrangement is used to connect the tubular modules 16 to the inlet/outlet modules 12.

The structure of the shuttling scraper is shown in FIG. 4. It is surprisingly simple, including a first wiper assembly 54, a second wiper assembly 56 and a spring 58 interconnecting the first wiper assembly 54 and the second wiper assembly 56.

The first and second wiper assemblies 54 and 56 have the same structure. A wiper 60 having the form of an annular disk and composed of a fluoroelastomer is sandwiched between two washers 62 and 64, and the sandwich is held together by a number of screws of which the screw 70 and the nuts 66 and 68 are typical.

The spring 58 yieldingly resists both compression and tension, and is composed of stainless steel wire.

The spring 58 serves as a spacer to maintain the separation between the wiper assembly 54 and the wiper assembly 56. Unlike wipers of the prior art, the shuttling scraper of the present invention cleans not only the inside surface of the tubular module 16, but also cleans the outside surface of the quartz tube 36. As noted above, the outside diameter of the wiper 60 is a few thousandths of an inch larger than the inside diameter of the tubular member 16, and the inside diameter of the wiper 60 is a few thousandths less than the outside diameter of the quartz tube 36. In this manner, the wiper 60 engages the inside of the tubular member 16 and the outside of the quartz tube 36 in an interference fit. Normally, the quartz tube 36 includes a sleeve of FEP, and the inside of the tubular member 16 is also coated with TEFLON ®, so that the amount of friction between the wiper 60 and the parts being cleaned is considerably less than it would be if the contacted surfaces were not coated with the TEFLON ®. Nevertheless, to provide positive operation and good wiping characteristics, the shuttling scraper is pushed through the tubular module 16 by the entire force of the liquid, and is not merely urged along by hydrodynamic drag. That is, the wiper 60 fills the entire space between the quartz tube 36 and the tubular module 16 and therefore serves as a piston; the propelling force is therefore the area of the annular wiper 60 multiplied by the pressure of the liquid.

FIG. 6 shows the shuttling scraper moving through the tubular module 16. Ordinarily, the friction on the leading wiper is greater than the friction on the trailing wiper, and therefore the spring is slightly compressed.

In FIG. 7, the shuttling scraper is shown after it has completed its trip through the tubular module, and has taken up its normal parking space within the return module 14. The liquid flowing from the tubular module 16 into the return module 14 exerts a hydrodynamic force on the wiper assembly 54 which causes the spring 58 to compress somewhat, thereby allowing the wiper assembly 54 to move out of the way of the incoming liquid, thereby reducing the pressure drop caused by the shuttling scraper.

In FIG. 8, the flow has ceased, as it must instantaneously between successive reversals of the direction of flow, and the spring 58 has resumed its normal length, thereby placing the wiper 60 adjacent the end of the tubular module 16. It can be appreciated from FIG. 8 that if the flow is then reversed, the wiper 60 will be driven into the tubular module 16, carrying with it the rest of the shuttling scraper. This results in dependable positive action of the shuttling scraper.

In the preferred embodiment of the present invention, the distance that the screws 70 protrude beyond the nuts 68, determines the exact axial position at which the shuttling scraper will be parked within the return module 14, and the protrusion of the screws 70 can therefore be adjusted to adjust the parking position of the shuttling scraper.

In an alternative embodiment a helical bumper spring is provided which encircles the quartz tube within the return module to reduce the shock that occurs when the shuttling scraper reaches the end of its travel. In other embodiments, bumpers are affixed to the shuttling scraper. At low flow rates the bumpers are not needed.

Figure 5:
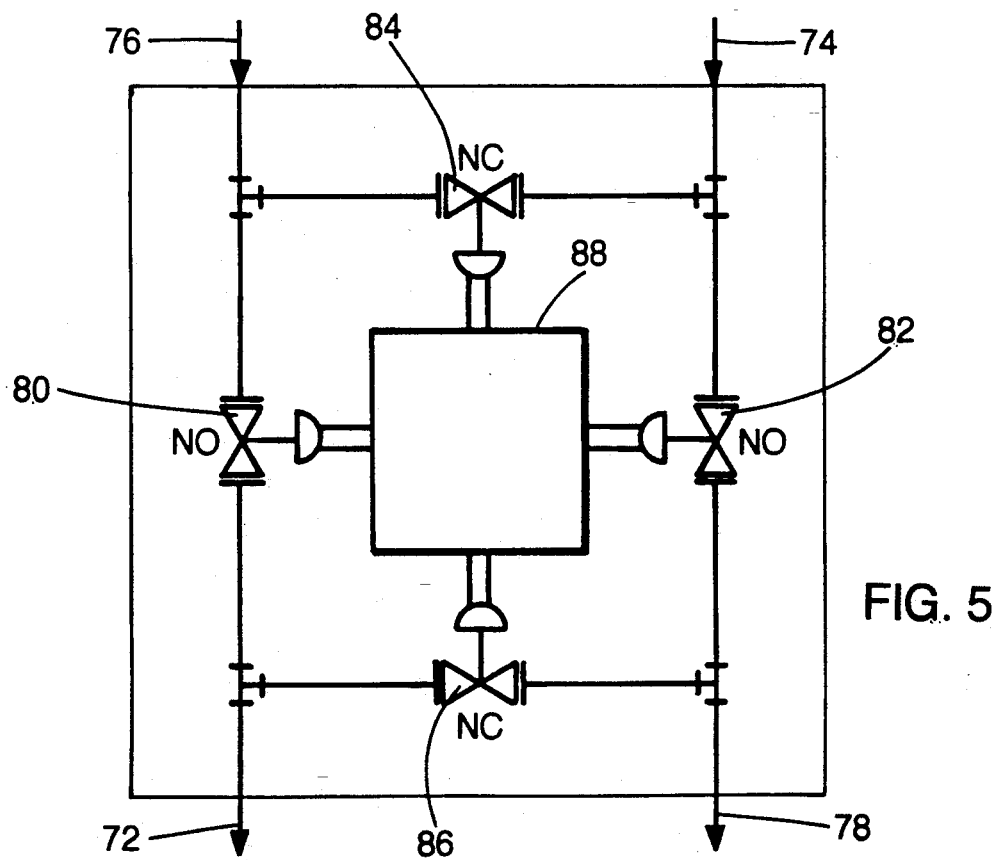
FIG. 5 is a hydraulic diagram showing a system of valves used in the preferred embodiment for reversing the flow.

FIG. 5 is a hydraulic diagram showing a system of valves used for reversing the flow in the oxidation chamber. The inlet and outlet of the oxidation chamber are connected to the lines 72 and 74 respectively. The source of liquid to be treated is attached to the line 76 and the treated liquid always flows out of the line 78. The valves 80, 82, 84 and 86 are electrically operated in the preferred embodiment, and the letters NO and NC stand for normally open and normally closed, respectively. The actuators of the valves are electrically controlled by the timing circuit 88 which, in the preferred embodiment, includes a provision for manual override.

Thus, there has been described an oxidation chamber that has a modular construction that greatly facilitates self-cleaning of the walls of the chamber and that permits the entire chamber to be constructed from three standard types of modules. Simultaneous cleaning of the inside walls of the tubular modules as well as of the quartz tube that contain the UV lamps is achieved by a shuttling scraper that travels the entire length of the tubular module each time the flow through the oxidation chamber is reversed. After the shuttling scraper has reached the end of its tubular module, the shuttling scraper parks inside the return module and does not cause an appreciable pressure drop.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. A device for wiping the inner wall of a first tube and the outer wall of a second tube that lies within said first tube and is coaxial with it, said device comprising in combination:
- a first wiper assembly including a first wiper having an annular shape and lying in a first plane perpendicular to the axis of said first tube;
- a second wiper assembly including a second wiper having an annular shape and lying in a second plane perpendicular to the axis of said first tube; and,
- resilient means connecting said first wiper assembly and said second wiper assembly, maintaining in the absence of applied forces a preset axial spacing between said first wiper assembly and said second wiper assembly but yielding resiliently to applied forces of tension and compression.

2. The device of claim 1 wherein the outside diameter of said first wiper is approximately equal to the inside diameter of said first tube and the inside diameter of said first wiper is approximately equal to the outside diameter of said second tube, and wherein the outside diameter of said second wiper is approximately equal to the inside diameter of said first tube and the inside diameter of said second wiper is approximately equal to the outside diameter of said second tube, whereby said first wiper and said second wiper each span the entire area between the inner wall of said first tube and the outer wall of said second tube so that said first wiper and said second wiper each act as pistons when pressurized liquid is applied to either of them within said first tube.

3. A device for wiping the inner surface of a tubular module having an end that is joined to a return module, and for wiping the outer surface of a lamp enclosure tube that extends coaxially within said tubular module and that extends beyond the end of the tubular module into and through the return module, said device comprising in combination:
- a first wiper assembly including a first wiper having an annular shape and lying in a first plane perpendicular to the axis of said tubular module;
- a second wiper assembly including a second wiper having an annular shape and lying in a second plane perpendicular to the axis of said tubular module; and,
- resilient means connecting said first wiper assembly and said second wiper assembly, maintaining in the absence of applied forces a preset axial spacing between said first wiper assembly and said second wiper assembly, but yielding resiliently to applied forces of tension and compression,
- said first wiper assembly being closer than said second wiper assembly to said return module when the device is within said tubular module;
- stop means connected to said first wiper assembly for stopping said device after it has traveled through said tubular module and into said return module, and for positioning said device within said return module with said second wiper assembly located approximately at the end of said tubular module when no liquid is flowing;
- whereby said second wiper assembly is pushed into said return module compressing said resilient means when a liquid is flowing from said tubular module into said return module, and whereby when the liquid is flowing from said return module into said tubular module, said second wiper assembly is driven into said tubular module pulling the first wiper assembly after it.

4. The device of claim 3 wherein said resilient means is a helical spring having an axis that is colinear with the axis of said tubular module, whereby when said first wiper assembly or said second wiper assembly encounters an obstruction while traveling through said tubular module, said resilient spring is compressed resulting in a relative rotation of said first wiper assembly with respect to said second wiper assembly, which helps the device to pass over the obstruction.

5. A modular oxidation chamber having self-cleaning capability, comprising:
- a modular oxidation chamber including
  - N pipe-like tubular modules each having two ends, where N is an integer;
  - N-1 return modules each including two ports receiving one end of each of two of said N pipe-like tubular modules;
  - a first inlet/outlet module including a first port receiving one end of one of said N pipe-like tubular modules, and including a second port;
  - a second inlet/outlet module including a first port receiving one end of one of said N pipe-like tubular modules and including a second port; and,
- a flow-reversing system for changing the direction of flow through said modular oxidation chamber from a FORWARD state to a REVERSE state and including
  - an inlet;
  - an outlet;
  - a first port connected to the second port of said first inlet/outlet module of said modular oxidation chamber;
  - a second port connected to the second port of said second inlet/outlet module of said modular oxidation chamberl and,
  - valve means for conducting a liquid from said inlet to said first port when and only when the direction of flow is in the FORWARD state and to said second port when and only when the direction of flow is in the REVERSE state, and for conducting a liquid from said second port to said outlet when and only when the direction of flow is in the FORWARD state and from said first port to said outlet when and only when the direction of flow is in the REVERSE state;
- N shuttling scrapers each associated with one of said N pipe-like tubular modules for wiping the inner surface of its tubular module and for wiping the outer surface of a lamp enclosure tube that extends coaxially within the tubular module and that extends beyond the end of the tubular module into and through a return module, each of said N shuttling scrapers including:
  - a first wiper assembly including a first wiper having an annular shape and lying in a first plane perpendicular to the axis of the tubular module;
  - a second wiper assembly including a second wiper having an annular shape and lying in a second plane perpendicular to the axis of the tubular module; and,
  - resilient means connecting said first wiper assembly and said second wiper assembly, maintaining in the absence of applied forces a preset axial spacing between said first wiper assembly and said second wiper assembly, but yielding resiliently to applied forces of tension and compression, said first wiper assembly being closer than said second wiper assembly to the return module when the shuttling scraper is within said tubular module;

stop means connected to said first wiper assembly for stopping said shuttling scraper after it has traveled through said tubular module and into said return module, and for positioning said shuttling scraper within said return module with said second wiper assembly located approximately at the end of said tubular module when no liquid is flowing;

whereby said second wiper assembly is pushed into said return module compressing said resilient means when a liquid is flowing from said tubular module into said return module, and whereby when the liquid is flowing from said return module into said tubular module, said second wiper assembly is driven into said tibular module pulling the first wiper assembly after it.

* * * * *